US012114112B2

(12) United States Patent
Schmogrow et al.

(10) Patent No.: US 12,114,112 B2
(45) Date of Patent: Oct. 8, 2024

(54) DEGREE SWITCHING CONFIGURATION FOR NETWORK ARCHITECTURE

(71) Applicant: Google LLC, Mountain View, CA (US)

(72) Inventors: Rene Schmogrow, San Jose, CA (US); Massimiliano Salsi, Sunnyvale, CA (US); Matthew Eldred Newland, San Jose, CA (US); Mattia Cantono, San Jose, CA (US)

(73) Assignee: Google LLC, Mountain View, CA (US)

( * ) Notice: Subject to any disclaimer, the term of this patent is extended or adjusted under 35 U.S.C. 154(b) by 789 days.

(21) Appl. No.: 17/066,850

(22) Filed: Oct. 9, 2020

(65) Prior Publication Data

US 2022/0116692 A1 Apr. 14, 2022

(51) Int. Cl.
*H04Q 11/00* (2006.01)
*G02B 6/35* (2006.01)
*H04J 14/02* (2006.01)

(52) U.S. Cl.
CPC ......... *H04Q 11/0005* (2013.01); *G02B 6/356* (2013.01); *H04J 14/0212* (2013.01); *H04J 14/0217* (2013.01); *H04J 14/022* (2013.01); *H04Q 2011/0011* (2013.01);
(Continued)

(58) Field of Classification Search
CPC ........ H04Q 11/0005; H04Q 2011/0011; H04Q 2011/0016; H04Q 2011/0024; H04Q 2011/0054; G02B 6/356; H04J 14/0212; H04J 14/0217; H04J 14/022; H04J 14/0219
See application file for complete search history.

(56) References Cited

U.S. PATENT DOCUMENTS 8,111,995 B2 2/2012 Wisseman
8,554,074 B2 10/2013 Boertjes et al.
10,454,609 B2 10/2019 Chedore et al.
(Continued)

FOREIGN PATENT DOCUMENTS

EP 3484167 A1 * 5/2019 ......... H04Q 11/0005
WO 2019103940 A1 5/2019

OTHER PUBLICATIONS

Extended European Search Report for European Patent Application No. 21171589.1 dated Oct. 29, 2021. 9 pages.
(Continued)

*Primary Examiner* — Leslie C Pascal
(74) *Attorney, Agent, or Firm* — Lerner David LLP

(57) ABSTRACT

The present disclosure describes a network including two levels of switching: a first level including wavelength selective switching via a first type of switching module, and a second level including fiber level switching via a second type of switching module. The two levels of switching allow for maintaining wavelength selective switching between transmission directions while introducing fiber selective switching between network degrees of the same transmission direction. The first type of switching module is configured to transmit and receive optical signals having a first set of wavelengths at a first network degree at a first direction in a node of a network. The second type of switching module is configured to transmit and receive the optical signals from the first type of switching module and route the optical signals at the first network degree to a second network degree in a second direction.

20 Claims, 11 Drawing Sheets

(52) U.S. Cl.
CPC .............. *H04Q 2011/0016* (2013.01); *H04Q 2011/0024* (2013.01); *H04Q 2011/0054* (2013.01)

(56) References Cited

U.S. PATENT DOCUMENTS

| | | |
|---|---|---|
| 10,516,482 B1 | 12/2019 | Schmogrow |
| 10,715,410 B2 | 7/2020 | Schmogrow et al. |
| 11,063,683 B1* | 7/2021 | Jones .................... H04J 14/025 |
| 2010/0150558 A1 | 6/2010 | Wisseman |
| 2011/0076016 A1* | 3/2011 | Wisseman .......... H04J 14/0213 398/83 |
| 2011/0222846 A1 | 9/2011 | Boertjes et al. |
| 2012/0328239 A1* | 12/2012 | Fuerst ................. H04J 14/0258 385/20 |
| 2014/0023373 A1 | 1/2014 | Tosaki |
| 2015/0333835 A1* | 11/2015 | Matsukawa ......... H04J 14/0227 398/83 |
| 2016/0149664 A1 | 5/2016 | Wagener |
| 2016/0261933 A1* | 9/2016 | Jenkins .............. H04J 14/0267 |
| 2017/0160484 A1 | 6/2017 | Way et al. |
| 2018/0262292 A1* | 9/2018 | Dangui ............. H04B 10/2916 |
| 2019/0238252 A1* | 8/2019 | Colbourne .......... H04J 14/0212 |

OTHER PUBLICATIONS

Office Action for European Patent Application No. 21171589.1 dated May 16, 2024. 7 pages.

* cited by examiner

DEGREE SWITCHING CONFIGURATION FOR NETWORK ARCHITECTURE

BACKGROUND

In a communication network, information such as a data stream or data packets may be transmitted from a source to a destination. The information may be transmitted as a data flow, which carries the information between the source and the destination along a communication path. The source and the destination may be nodes in the network. The nodes may be, for example, computing devices such as personal computers, phones, or tablets; servers such as email servers, data servers, or web servers; routers; switches; and other networking devices. Each communication path is made up of one or more links (or edges). A link or edge refers to a connection between two adjacent nodes. Each link or edge is associated with a capacity or bandwidth, which represents the amount of data that the link or edge is capable of carrying at any given time.

Where the network is a mesh optical network, the nodes may be configured to be colorless, directionless, and contentionless. Colorless nodes can receive and/or transmit signals of multiple wavelengths. Directionless nodes can direct signals in multiple directions. Contentionless nodes can receive and/or transmit multiple signals with the same wavelength within the same node. The colorless, directionless, and contentionless ("CDC") network is often implemented with one or more reconfigurable optical add and drop multiplexer ("ROADM") nodes. A ROADM node may be configured to optically route optical signals to other nodes in the network in multiple directions, as well as to convert the optical signals into electrical signals for transmission to local routers by utilization of optical transponders.

As more nodes, data flows, and edges are added to the network, it becomes increasingly complicated to allocate communication paths for different data flows. Due to the current limited number of network edges originating or terminating in a common node of CDC technology, the increased deployment of multiple edges often requires split and partitions of the edges among multiple nodes. Choosing the appropriate amount of data to allocate to the given edge and balancing the bandwidth of the edges in the network with the desire to route each data flow in a fast, efficient manner becomes increasingly challenging.

BRIEF SUMMARY

The present disclosure provides two levels of switching that include wavelength selective switching via a first type of switching module and fiber level switching via a second type of switching module. The two levels of switching allow for maintaining wavelength selective switching between transmission directions while introducing fiber selective switching between network degrees of the same transmission direction. A transmission direction in this context is a set of edges that connect the same two nodes and share a common path. A network degree is part of a network node originating or terminating an edge. In one example, a system includes a first type of switching module in a node of a network. The first type of switching module is configured to receive optical signals having a first set of wavelengths at a first network degree and in a first direction. A second type of switching module is configured to receive the optical signals from the first type of switching module. The second type of switch module is configured to route the optical signals at the first network degree to a second network degree in the second direction.

In some examples, the first type of switching module includes one or more wavelength selective switches (WSS) configured to route the received optical signals to a plurality of ports configured for receiving one or more wavelengths of the first set of wavelengths in the second direction. The second type of switching module includes one or more optical circuit switches (OCS) or optical fiber switches configured to route the received optical signals among a plurality of degrees in the second direction.

In some examples, an add/drop module is configured to add or drop one or more wavelengths of the first set of wavelengths. The add/drop module connects one or more data center interconnect (DCI) transponders connected to the add/drop module, and a plurality of add or drop ports configured to transport optical signals from the one or more DCI transponders. In some examples, a third type of switching module is configured to route the optical signals to or from the add/drop module at a predetermined network degree. The third type of switching module is configured to route the optical signal from the add/drop module to different degrees in a direction determined by the first type switching modules. The third type of switch module includes one or more optical circuit switches (OCS) or optical fiber switches.

In some examples, a fiber shuffle is configured to route the optical signal among the first or second type of switching modules. Each network degree includes two of the first type of switch modules and two corresponding amplifiers.

Another aspect of the present disclosure further provides a network. The network includes a plurality of nodes connected to one another. At least one node of the plurality of nodes includes a first type of switching module in a node of a network. The first type of switching module is configured to receive optical signals having a first set of wavelengths at a first network degree and in a first direction. A second type of switching module is configured to receive the optical signals from the first type of switching module, the second type of switch module configured to route the optical signals at the first network degree to a second network degree in a second direction.

In some examples, a first node in the network connects to a second node via multiple edges in the first direction. A third node in the network connects to the second node via multiple edges in the second direction different from the first direction. In some examples, the multiple edges include parallel multiple fiber rails. The first type of switching module includes one or more wavelength selective switches (WSS) configured to route the received optical signals to a plurality of ports configured for receiving one or more wavelengths of the first set of wavelengths in the second direction. The second type of switching module includes one or more optical circuit switches (OCS) or optical fiber switches configured to route the received optical signals among the plurality of the network degrees in the second direction.

Another aspect of the present disclosure further provides a method. The method includes receiving, at a node of a network, optical signals having a first set of wavelengths at a first network degree in a first direction, and routing, via a first switching module, the optical signals from the first network degree in the first direction to a second direction. The method further includes routing, via a second switching module, the received optical signals having the first set of wavelengths to a second network degree in the second direction.

In some examples, the optical signals may be routed to an add/drop modules. The first switching module comprises one or more optical circuit switches (OCS) or optical fiber switches. The second switching module comprises one or more wavelength selective switches (WSS).

DETAILED DESCRIPTION

Figure 1:
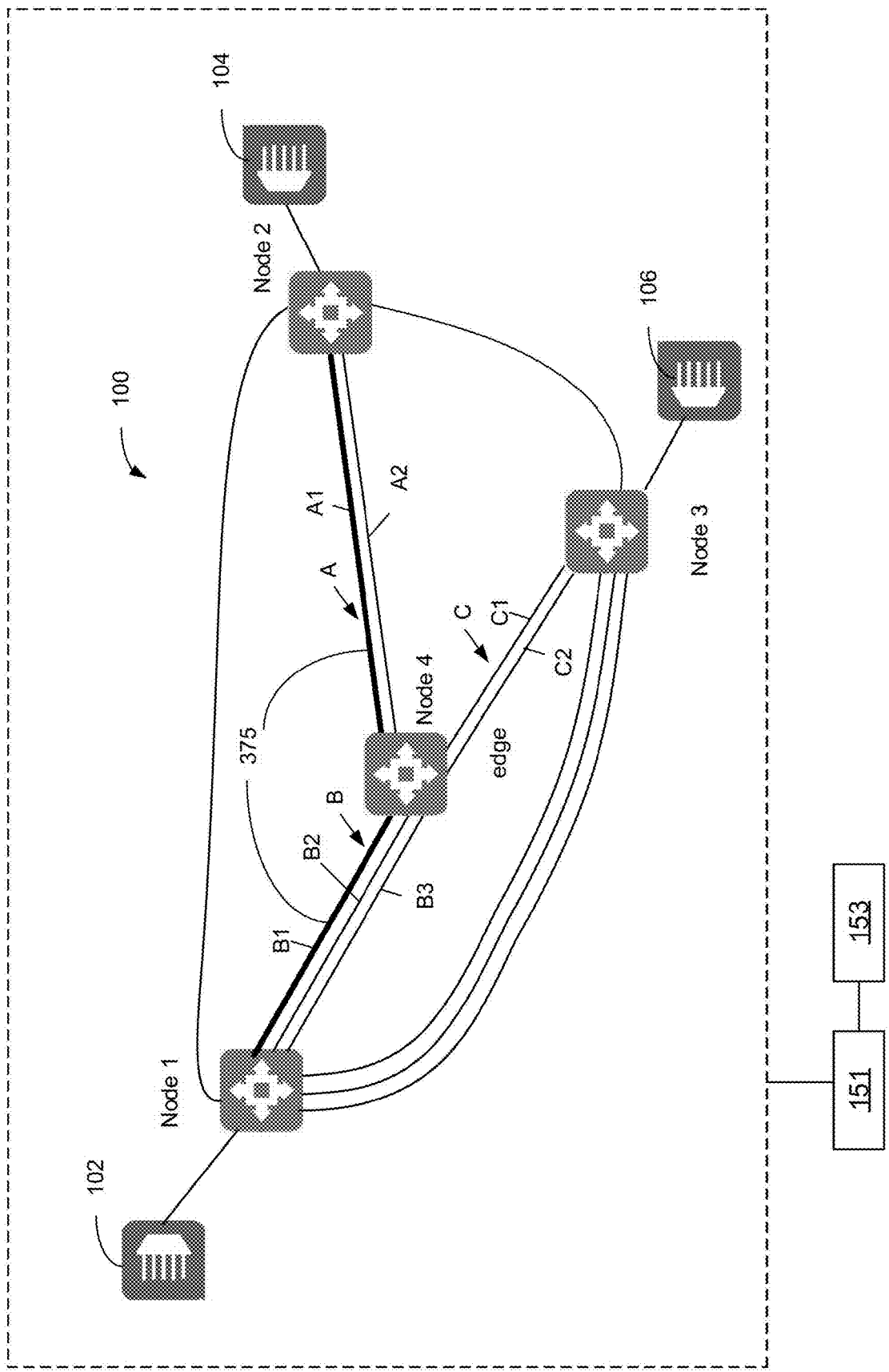
FIG. 1 shows an example CDC network in accordance with aspects of the disclosure.

The technology relates generally to an optical colorless, directionless, and contentionless (CDC) mesh network. The optical CDC mesh network utilizes one or more reconfigurable optical add and drop multiplexer ("ROADM") nodes. The data flows may be transmitted over communication paths in the optical (CDC) mesh network. As used herein, a connection between two nodes is referred to as an edge or a link connecting a source and a destination, such as between nodes. For purposes of discussion herein, the transmission medium of the optical CDC mesh network is assumed to be fiber optic cable, and the network is referred to an optical CDC mesh network. However, implementations are not limited in this regard.

In an optical CDC mesh network, information or data is transmitted along a communication path connecting the source node and the destination node using an optical signal that is modulated onto one or more carrier waves that form an optical channel or circuit. The source node and the destination node may be considered end nodes of the network or communication path connecting the source and destination nodes to each other. At the source node and the destination node, the optical signal is formed via electrical-to-optical conversion and recovered via optical-to-electrical conversion. In between a source node and a destination node, an optical signal is generally transmitted via the optical channel without optical-to-electrical-to-optical (OEO) conversion or regeneration. In some instances, the optical channel may travel through one or more intermediate nodes and the edges or links that connect the intermediate nodes. An intermediate node may not need to perform OEO conversion or regeneration on the received optical channel, and functions merely to direct (and in some cases amplify) the received optical signal onto the edge or link connected to the subsequent node (another intermediate node or a destination node) along the path.

As the number of ROADM nodes in the network increases and the required number of edges or paths between two nodes increases, allocating paths for data flows among the nodes becomes difficult. Thus, a second level or dimension of switching, in addition to a first level of wavelength selective switching, is provided via an optical fiber switching module at one or more of the nodes in the optical CDC mesh network for additional communication paths among the nodes. The optical fiber switching module may be installed parallel to the existing network architecture so that the second level or second dimensional optical fiber switching in the ROADM nodes may increase the communication scale in the optical CDC mesh network. The optical fiber switching module, or called fiber level switching module, is implemented in the optical CDC mesh network without significantly impacting or altering the existing node configuration or arrangement. Thus, the existing node configuration in the optical CDC mesh network may be upgraded by implementing the optical fiber switching module at one or more predetermined nodes in the optical CDC mesh to increase the communication switching and expand the add/drop capacity in the optical CDC mesh network.

FIG. 1 depicts an example of an optical CDC mesh network 100 that utilizes one or more reconfigurable optical add and drop multiplexer ("ROADM") nodes. In one example, a first transponder connected to an add/drop module 102 of ROADM Node 1, which serves as a source node, may be configured to transmit an optical signal of wavelength a to ROADM Node 2, which serves as a destination node, through ROADM Node 4 using edges B1, B2, or B3 and A1 or A2. In the example depicted in FIG. 1, the optical signal may be transmitted from Node 1 using edge B1 through Node 4 to Node 2 using edge A1, as shown in the bold line 375. The ROADM Node 4 serves an intermediate node. Each edge A1, A2, B1, B2, B3, C1, C2 comprises at least a pair of incoming and outgoing fiber optic cables.

In the example depicted in FIG. 1, multiple fiber rails, or multiple edges, are utilized to increase the bandwidth, as opposed to a single fiber rail. For example, seven network degrees A1, A2, B1, B2, B3, C1, C2 of the edges belonging to Node 4, such as communication paths or ports, and are configured in three different transmission directions, such as a first direction A between Node 2 and Node 4 (edges of A1, A2), a second direction B between Node 1 and Node 4 (edges of B1, B2, B3) and a third direction C between Node 3 and Node 4 (edges of C1, C2) to facilitate optical signal communications in the optical CDC mesh network 100. It is noted that a network degree as referred herein is part of a network node originating or terminating an edge. A transmission direction is a set of edges that connect the same two nodes and share a common path. The parallel rails, such as edges of A1, A2 in the first direction A, edges of B1, B2, B3 in the second direction B, or edges of C1, C2 in the third direction C, may be grouped and each group A, B, C is then referred as a direction A, B, C. In the example depicted in FIG. 1, the ROADM Node 4 has seven degrees A1, A2, B1, B2, B3, C1, C2 of the edges distributed in three different directions A, B, C for Node 4 to be in communication with Node 2, Node 1, and Node 3 respectively. Each edge A1, A2, B1, B2, B3, C1, C2 comprises at least a pair of incoming and outgoing fiber optic cables.

A network controller 151 controls the operation and configuration of the various components of the optical CDC mesh network 100. The network controller 151 is communicably coupled to components of the optical CDC mesh network 100 and may include hardware-based logic or a combination of hardware-based logic and software-based logic to execute instructions. The network controller 151 may include logic that may interpret, execute, and/or otherwise process information contained in, for example, a memory 153 communicably coupled to the network controller 151. The information may include computer-executable instructions and/or data used to control the operation of the Node 1, Node 2, Node 3 and Node 4, input and/or output device of the optical CDC mesh network 100 in order to implement a method for transmitting data from the source node and the destination node via the edges A1, A2, B1, B2, B3, C1, C2 according to one or more implementations of the present disclosure.

The network controller 151 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores. Moreover, the network controller 151 may include a system-on-chip (SoC) or system-in-package (SiP).

Figure 2:
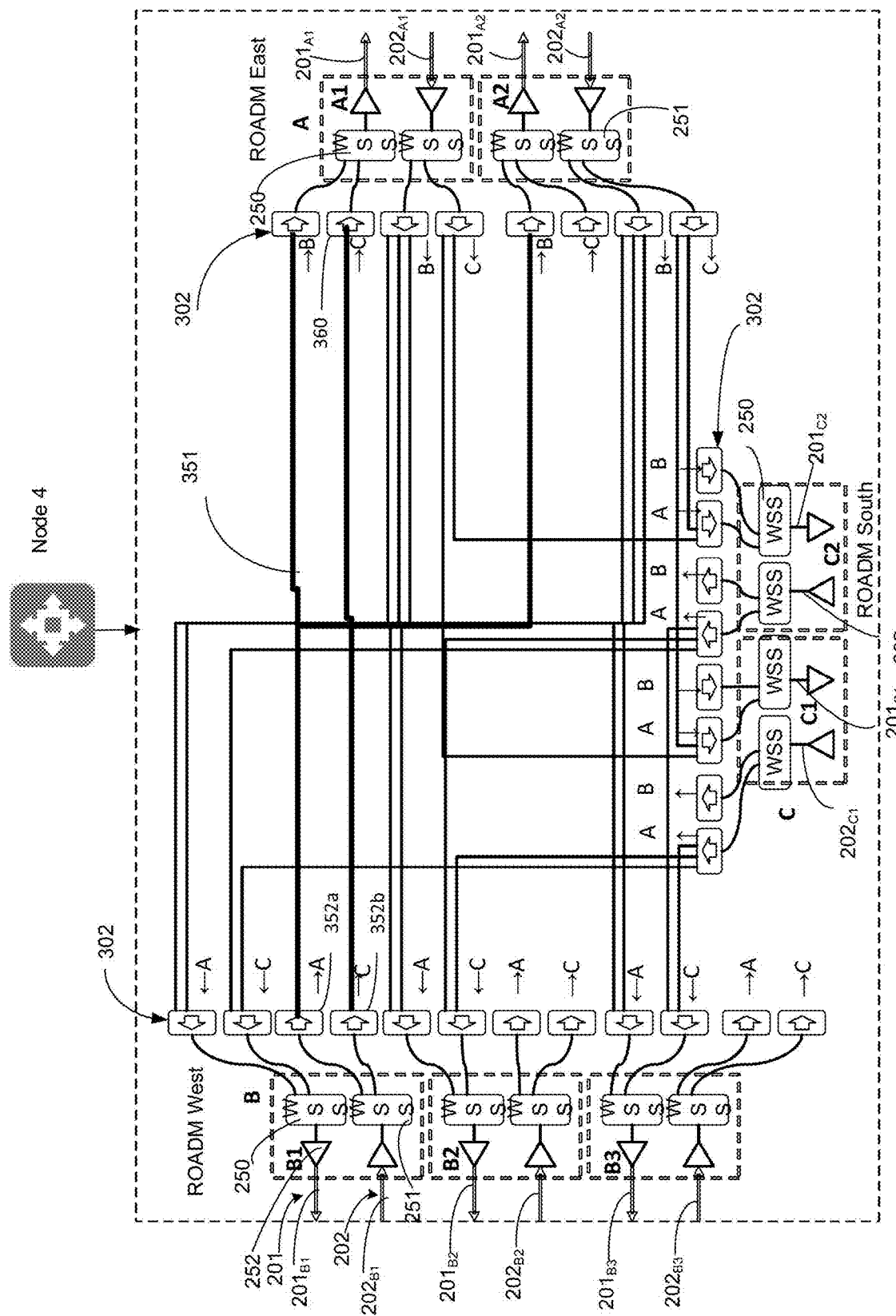
FIG. 2 shows an example node in an example CDC network in accordance with aspects of the disclosure.

FIG. 2 shows an example ROADM node, such as Node 4 of FIG. 1. In the example depicted in FIG. 2, the ROADM Node 4 is connected in three directions, labeled as "ROADM West" located at direction B, "ROADM East" located at direction A, and "ROADM South" located at direction C, each of which may receive incoming signals from and/or transmit outgoing signals to other nodes of the optical CDC mesh network 100. Each degree A1, A2, B1, B2, B3, C1, C2 comprises two switching modules, such as two wavelength selective switches (WSS) 250, 251, as well as ingress and egress erbium doped optical fiber amplifiers (EDFA) 252. For example, each degree A1, A2, B1, B2, B3, C1, C2 is in electrical communication with a pair of optical amplifiers 252 with an input port 202 (shown as $202_{A1}$, $202_{A2}$, $202_{B1}$, $202_{B2}$, $202_{B3}$, $202_{C1}$, $202_{C2}$ in each degree) connected to a 1×N fan-in wavelength selective switch (WSS) 251, and an output port 201 (shown as $201_{A1}$, $201_{A2}$, $201_{B1}$, $201_{B2}$, $201_{B3}$, $201_{C1}$, $201_{C2}$ in each degree) connected to another N×1 fan-out WSS 250. An optical connection is formed between the WSS 250, 251 and the respective optical amplifiers 252 in each degree A1, A2, B1, B2, B3, C1, C2. The WSS 250, 251 may be configured to route optical signals from different input port(s) 202 in the incoming optical signals to their respective communication paths to designated output port(s) at different degrees and directions or vice versa. For example, the WSS 251 may be configured to route optical signals from the input port $202_{B1}$ in degree B1 to the output port in direction A or C. It is noted that the optical signals may be routed from a first network degree at a first direction to the plurality of ports at a second direction. Multiplexed optical signals on input port $202_{B1}$ from network degree B1 may be selectively directed via the WSS 251 to the WSS 250 in another direction and its associated outputs $201_{A1}$ or $201_{A2}$ or $201_{C1}$ or $201_{C2}$ for network degrees A1, A2 and/or C1, C2. In the same manner, multiplexed optical signals on input ports $202_{C1}$, $202_{C2}$ or as $202_{A1}$, $202_{A2}$ from network degrees C.1, C2 or A1, A2 may be similarly routed to the other network degrees of the optical CDC mesh network 100.

In the example depicted in FIG. 2, an additional switching module 302, such as an optical fiber switching module or a fiber level switching module, may be configured to route the optical signal to provide additional communication paths to different network degrees. For example, in the direction B of Node 4, each WSS 250, 251 in each network degree B1, B2, B3 is optically communicated to the switching module 302 configured to route the optical signal from the WSS 250, 251 among different network degree B1, B2, B3 in the same direction B. The switching module 302 is a different type of the switching module from the WSS 250, 251 in its functions and capability. In one example, the switching module 302 may be an optical circuit switch (OCS), optical fiber switch, planar lightwave circuit (PLC) or other types of optical switches. In some examples, the switching module 302 may realize a logic or algorithm configured at the controller defined in the ROADM node or in the controller 151 defined in the optical CDC mesh network 100.

The switching module 302 provides another level or another dimension of switching functions to input or output optical signals to different network degrees in the same direction. For example, the switching module 302 provides additional communication paths 351 among different network degrees, such as among A1 or A2, among B1 or B2, or B3, or another C1 or C2, in addition to the communication path among different directions, A, B, C. It is noted that the communication paths 351 shown in FIG. 2 may only be an example and some of the communication paths may not be shown for case of explanation and illustration.

The optical signals having a set of wavelengths from the input port $202_{B1}$ from edge B1 may transmit through the WSS 251. The WSS 251 may selectively transmit one or more of the wavelengths from the set of wavelengths to a designated output port through the communication paths 351. Thus, the WSS 250, 251 provides the capability for different wavelength switching from the optical signals from a first direction to a second direction, such as from direction B to direction A or C. However, WSS 250, 251 only provide a first level, or called a first dimension of switching among different directions A, B, C. The addition of the switch module 302 provides another level, such as a second level or second dimension of switching, that allows to maintain wavelength selective switching from WSS 250, 251 among directions A, B, C while introducing fiber selective switching between network degrees of the same direction A or B or C. Thus, the switching module 302 implemented and/or configured in the ROADM node may provide an additional level of communication paths among different network degrees. For example, the first level of switching from the WSS 250, 251 determines to which direction the incoming optical signal to be routed. The second level of switching from the switching module 302 determines to which network degree, within the predetermined direction by the first level of switching from WSS 250, 251, are routed. Thus, by implementing the fiber level switching module 302 in the ROADM node, additional communication path selecting and switching may be added without altering or changing the existing architecture defined in the ROADM node. The second level, or second dimension, of the switching provided from the switching module 302 may serve as a multiplier to the number of the switchable degrees in a conventional ROADM. By doing so, 16×N fiber pairs with a single node with N being the number of fan-out ports of the switch may be obtained. Thus, the ROADM node may be scaled well beyond 16 connected edges provided by a conventional ROADM node.

In the example depicted in FIG. 2, the switching module 302 is implemented in Node 4 by electrically or physically, such as via fiber optic cables, to the WSS 250, 251. It is noted that the switching module 302 may be implemented in Node 4 by various manners.

Figure 3:
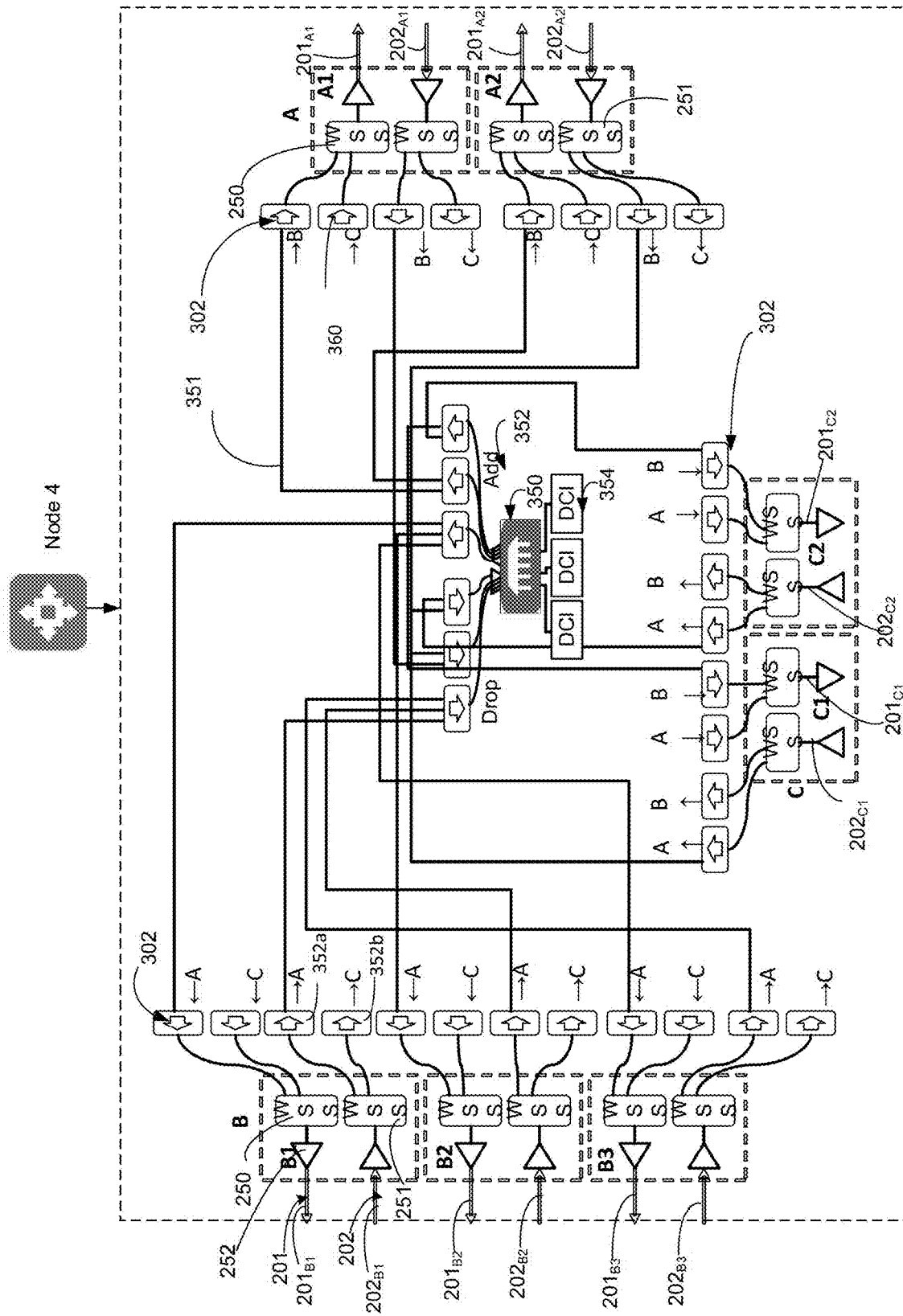
FIG. 3 shows another example node in an example CDC network in accordance with aspects of the disclosure.

FIG. 3 depicts another example ROADM node, similar to the ROADM Node 4 depicted in FIG. 2 with the switching module 302 implemented therein. In addition to the switching module 302 described above, additional optical components, such as an add/drop module 352 connected to high performance data center interconnect ("DCI") transponders 354 and comprising add/drop structures 350, such as MUX (add)+DeMUX (drop) ports, may also be utilized in the ROADM Node 4. The high performance data center interconnect ("DCI") transponders 354 may be configured to perform optical to electrical or electrical to optical conversions on the optical cables. Add/drop structures 350, such as MUX (add)+DeMUX (drop) ports, may allow transmissions within and beyond the node when the added signals do not stay within a single node. The ROADM node may be configured to maximize optical routing (without converting to or from electrical signals), such as shown for routing signals between all degrees of the node, and to minimize optical to electrical conversions for local add/drop. In the example depicted in FIG. 3, the add/drop structure 350 and one or more data center interconnect ("DCI") transponders 354 connected to the add/drop structure 350 may be configured to receive optical signals from the switching modules 302 or WWS 250, 251 to add or drop optical signals. It is noted that the communication paths 351 shown in FIG. 3 may only be an example and some of the communication paths may not be shown for ease of explanation and illustration. The add/drop structure 350 and one or more data center interconnect ("DCI") transponders 354 at the ROADM Node 4 as depicted in FIG. 3 may allow the optical signals to optionally be dropped or added locally. By doing so, different parts of the spectrum, or wavelengths, of the optical signals of an add/drop port may be routed to or from different directions via the WSS 250, 251. Furthermore, the degree within a direction may also be selected via the switching modules 302, 354 to further route to the desired destination node.

Figure 4:
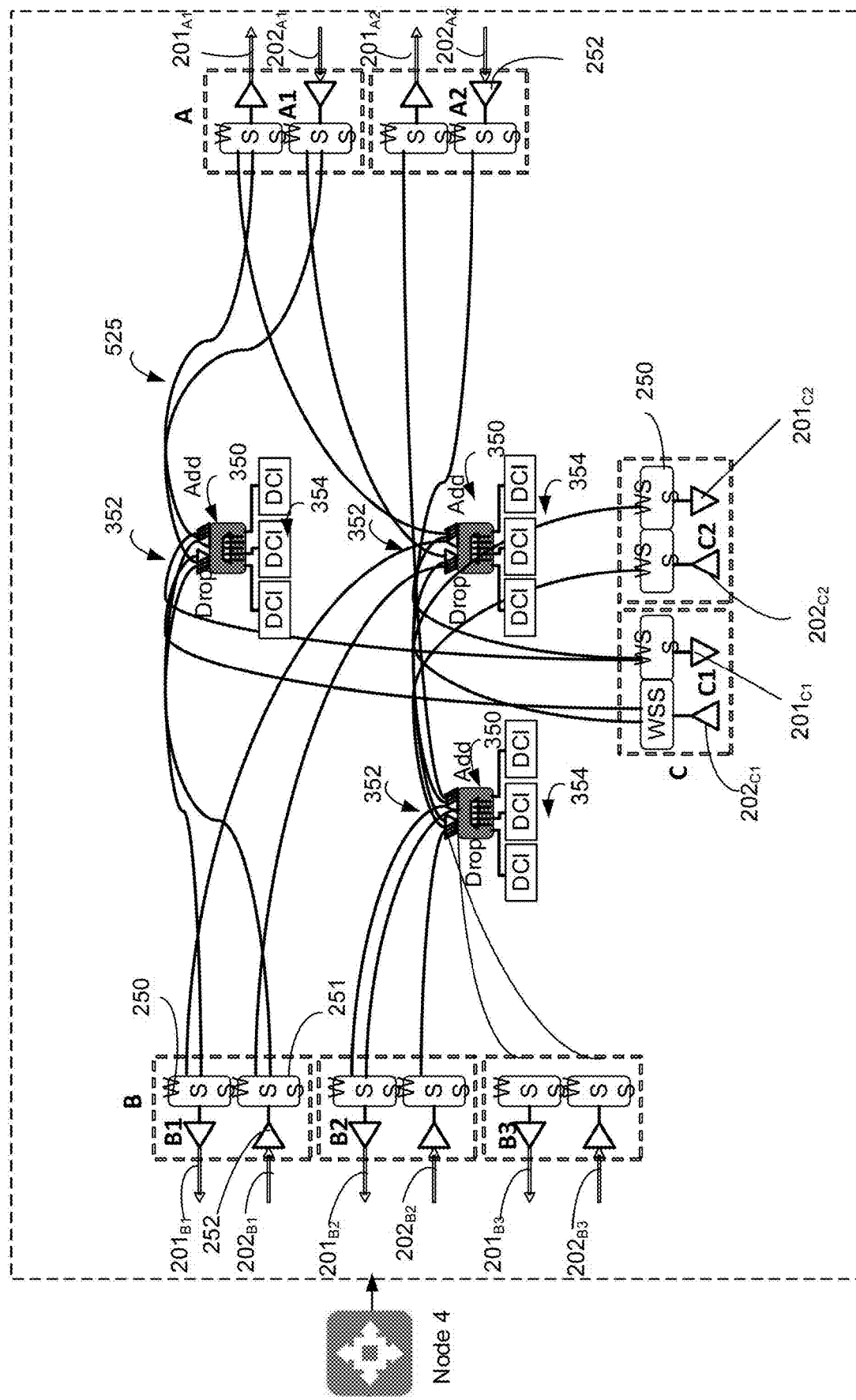
FIG. 4 shows still another example node in an example CDC network in accordance with aspects of the disclosure.

FIG. 4 depicts another example ROADM node, similar to the ROADM Node 4 depicted in FIG. 3 without the switching modules 302 but instead utilizing add/drop module 352 to selectively route and add/drop optical signals locally in the ROADM Node 4. It is noted that add/drop modules may be added with or without the switching modules 302 for different architecture configurations. In one example, the add/drop module 352 may be added in any directions, such as direction A, B or C, to add or drop optical signals, but only to a specific degree in the direction A, B or C. The added or dropped optical signals may or may not be routed among different degrees in one direction. For example, when the added or dropped optical signals are routed in a specific degree, such as A1 in direction A, such added or dropped optical signals may not be routed or switched to another degree, such as A2, in the same direction A. It is noted that based on traffic distribution across different geographical locations and/or datacenters, some portions of the optical signals may be routed to local add/drop modules 352 for local traffic, while other portions of the optical signals may be routed to express connectivity. In the example depicted in FIG. 4, the express connectivity is omitted for ease of illustration and explanation.

Figure 5A:
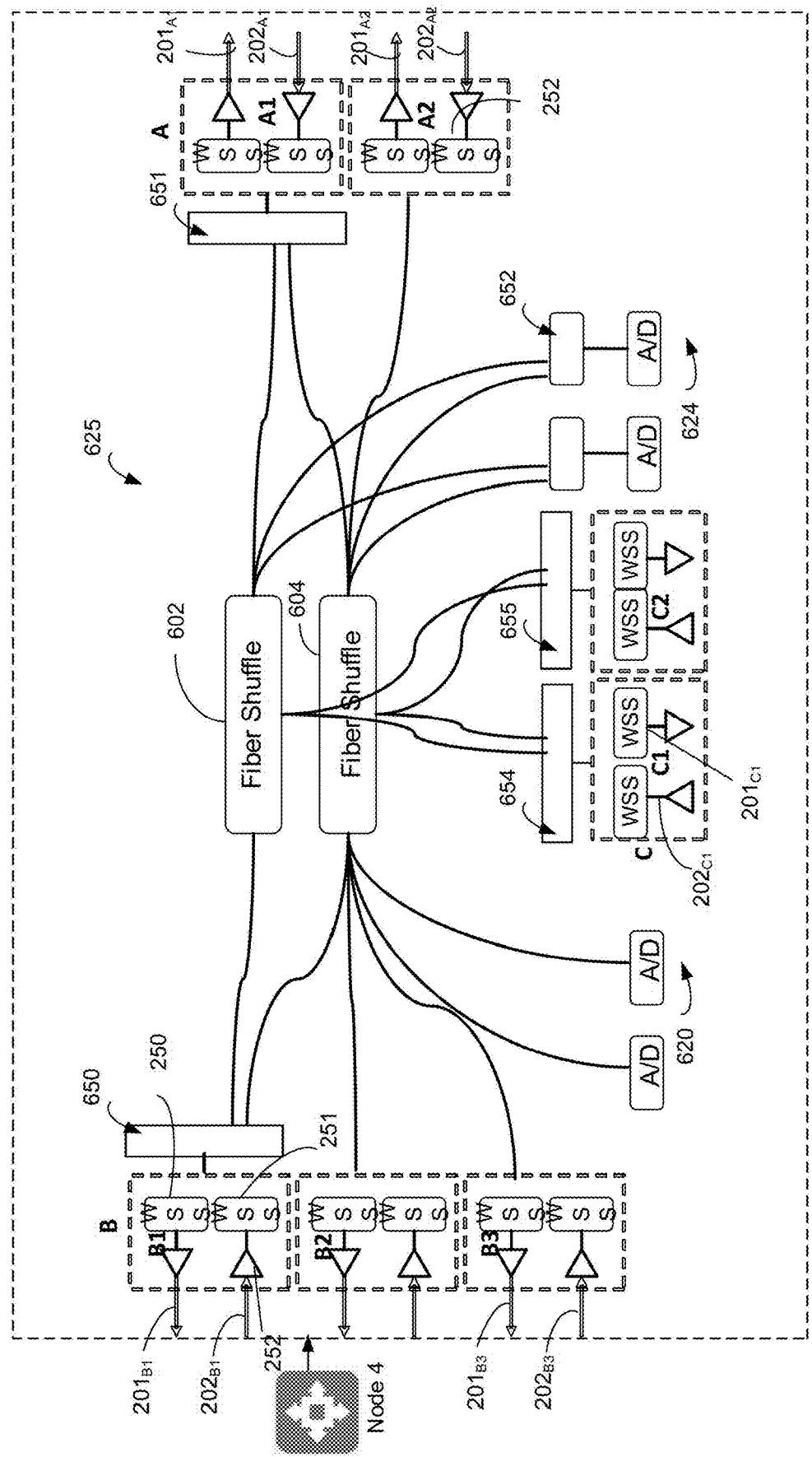
FIG. 5A shows a communication path configuration in an example node in an example CDC network in accordance with aspects of the disclosure.
Figure 5B:
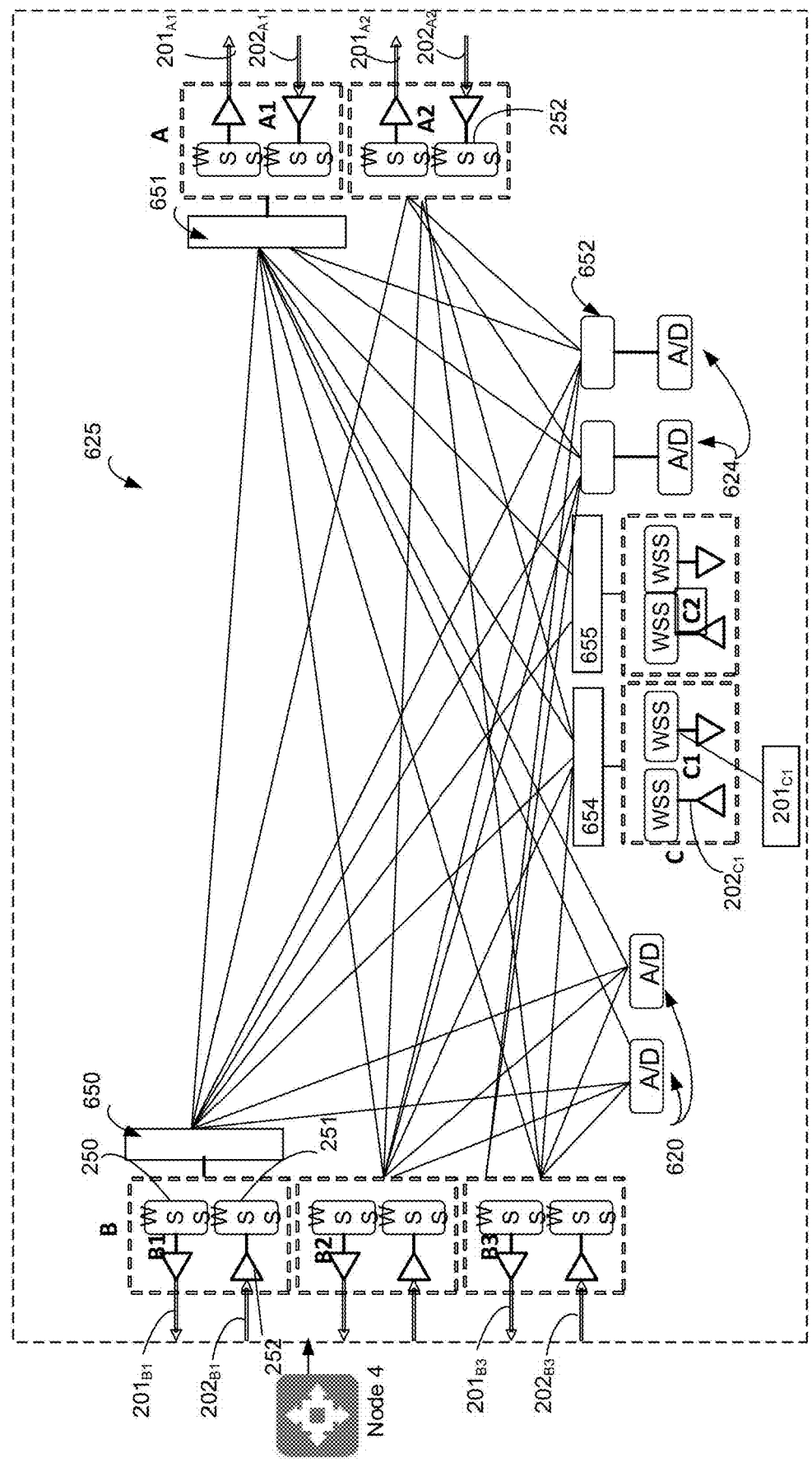
FIG. 5B shows the communication path configuration of FIG. 5A, without the fiber shuffle, in accordance with aspects of the disclosure.

FIGS. 5A and 5B depicts yet another example ROADM node utilizing switching modules 650, 651, 652, 654, 655, fiber shuffles 602, 604, and add and drop modules 620, 624, such as the add/drop module 352 including the add/drop structure 350 and one or more DCI transponders 354 described above. In this example, the switching modules 650, 651, 652, 654, 655, similar to the switching module 302 described above, are selectively implemented at certain degrees in each direction A, B, C. For example, the switching module 650 may electrically communicate with the WSS 250 in degree B1 in direction B, in degree A1 at direction A, and/or in degree C.1 and/or C2 in direction C. The switching modules 652 may also be configured to route optical signals to the add and drop modules 624 for local add or drop. Any number of switching modules may be utilized in the ROADM node 4.

One or more fiber shuffles 602, 604 may be distributed among the switching modules 650, 651, 652, 654, 655. The fiber shuffle 602, 604 may include passive optical connectors for simplifying routing of optical cabling of the ROADM Node 4. However, as shown in FIG. 5B, it is possible to route cables among the ROADM Node 4 and add/drop modules 624, 620 directly and without use of the fiber shuffle 602, 604. The communication paths 625 may be routed and connected to the fiber shuffle 602, 604 via respective optical fibers. As the degrees of the ROADM Node increase, it can become difficult to map and verify each connection within the ROADM node. Additional difficulties in mapping and verifying each connection arise when the ROADM includes degrees and multiple add/drop modules 624, 620 and components. Thus, the fiber shuffle 602, 604 as utilized may be sufficiently flexible to support a range of module numbers and types, and the fiber shuffle 602, 604 may include multiple ports that may be used for various module types. By doing so, the fiber shuffle 602, 604 may facilitate different interconnect patterns between degrees, and/or add/drop modules.

In the example depicted in FIG. 5A, by way of example only, the first fiber shuffle 602 may facilitate routing optical signals from degree B1 to other degrees A1, C1, C2 and/or the add/drop modules 624 through the switching modules 650, 651, 652 respectively. The second fiber shuffle 604, by way of example only, may facilitate routing optical signals from degrees B1, B2, B3 to other degrees A1, A2, C1, C2 and/or the add/drop modules 624, 620 with or without routing through the switching modules 650, 651, 652. This example shows how a traditional CDC node can be extended with the proposed new architecture into a hybrid node. As a result, an existing CDC network can be gracefully evolved rather than removing and replacing with the new architecture.

Figure 6:
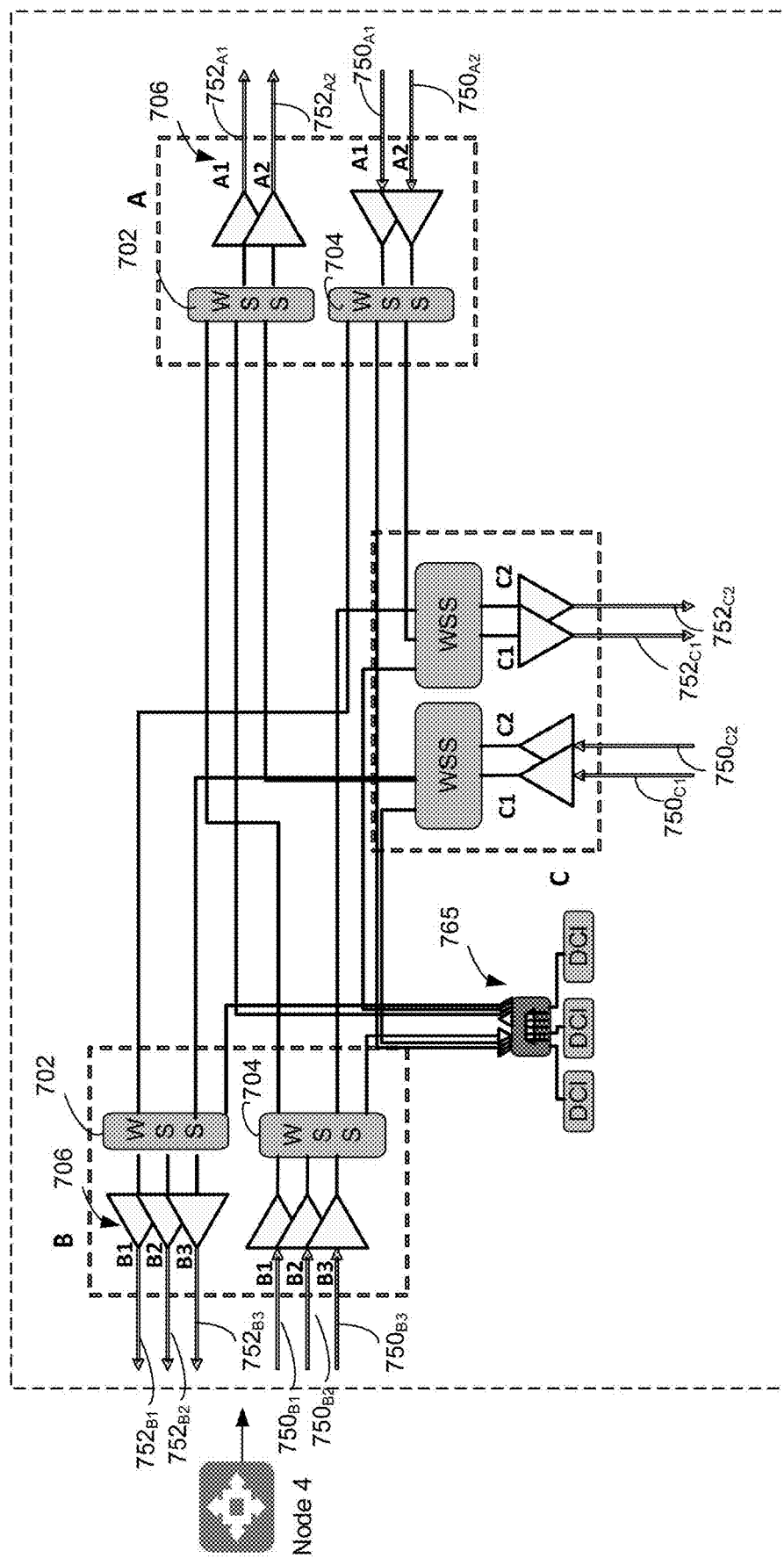
FIG. 6 shows an example node in an example CDC network in accordance with aspects of the disclosure.
Figure 7:
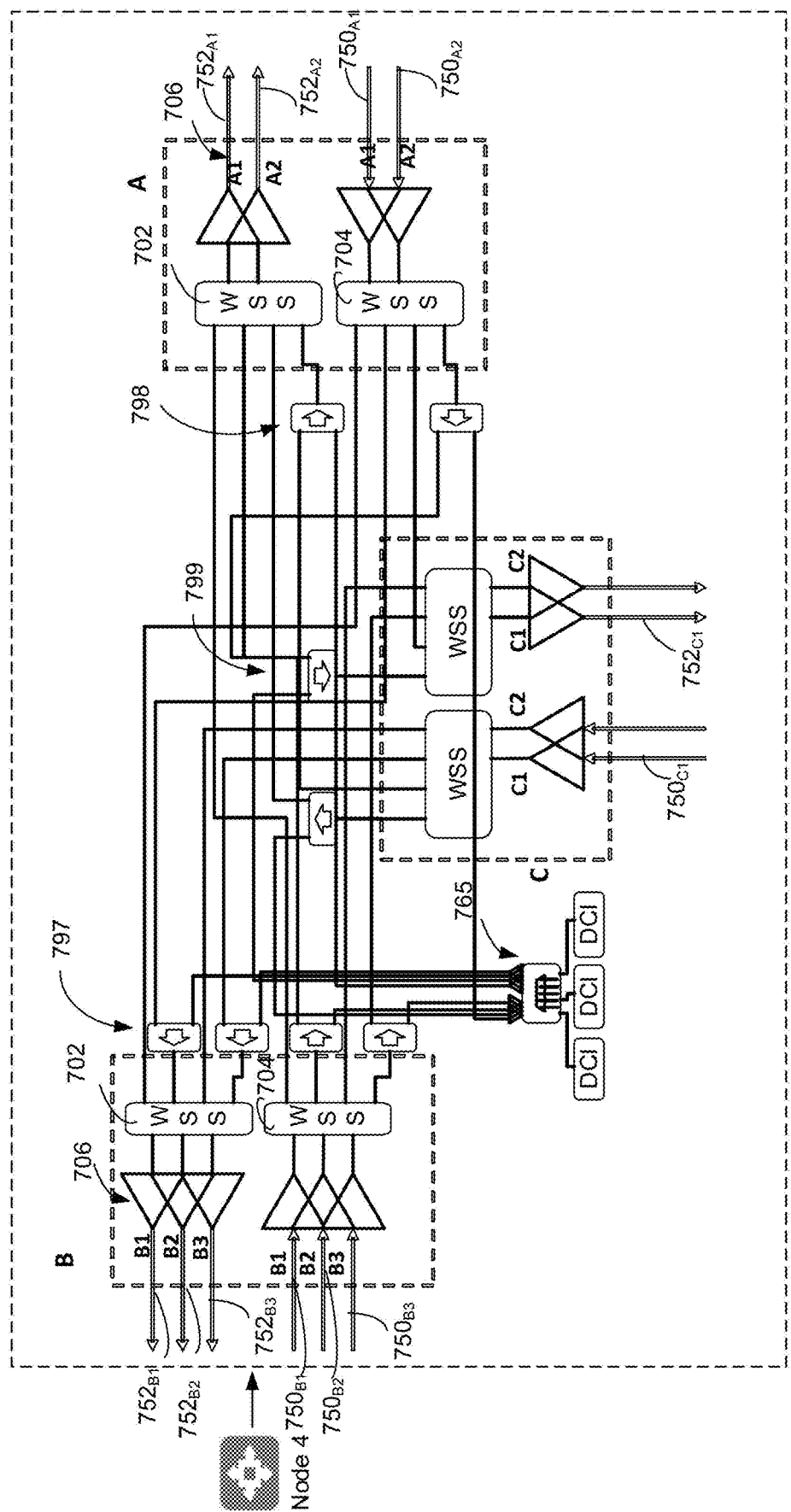
FIG. 7 shows another example node in an example CDC network in accordance with aspects of the disclosure.

FIG. 6 depicts another example of a ROADM node that utilizes an array of amplifiers 706 to route optical signals to a WSS 702, 704, such as a M×N WSS. A M×N WSS includes M switching elements for coupling M inputs or outputs to N inputs or outputs. M and N are both integers that present the numbers of the ports. In one example, the WSS 702, 704 in FIG. 7 is a 8×24 WSS (M as 8 and N as 24), which provides 8 ports or degrees within a direction, as opposed to the 1×32 ports WSS 250, 251 described above. In the example depicted in FIG. 6, three input ports $750_{B1}$, $750_{B2}$, $750_{B3}$, and three output ports $752_{B1}$, $752_{B2}$, $752_{B3}$, are utilized in degrees B1, B2, B3 respectively in direction B; two input ports $750c1$, $750c2$, and two output ports 752c1, 752c2, are utilized in degrees C.1, C2 respectively in direction C; two input ports $750_{A1}$, $750_{A2}$, and two output ports $752_{A1}$, $752_{A2}$, are utilized in degrees A1, A2 respectively. It is noted that the numbers of the input/output ports utilized in each degree within each direction may be up to 8 ports, although only three are shown in direction B, two ports as shown in direction C and A. It is noted that numbers of the input/output ports utilized in each degree within each direction may be configured to be more than 8 ports, such as 16 or more, based on different configurations of the communication architecture.

An add/drop module 765, similar to the add/drop module 352 may be utilized to add or drop optical signals locally. The number of the add/drop module 765 and the M×N WSS 702, 704 and/or the array of amplifiers 706 may be varied or configured in various ways. For example, use of the 8×24 WSS 702, 704 may provide possible cost saving as the connection ports and the switching functions are integrated in a single structure of 8×24 WSS 702, 704, as compared to the standard 1×32 ports WSS 250, 251 and the arrays of switch modules 302 described above.

FIG. 7 depicts another example of a ROADM node that utilizes similar architecture from FIG. 6, such as an array of amplifiers 706 connected to a 8×24 WSS 702, 704, which provides 8 ports in a degree within a direction. In addition to the architecture from FIG. 7, switching modules 797, 798, 799, similar to the fiber level switching module 302 described above, are implemented to provide additional network degree communication at each direction A, B, C. It is noted that the number of the switching modules 797, 798, 799 implemented in each direction A, B, C may be varied. In the example depicted in FIG. 7, at least one or more switching modules 797, 798, 799 is configured to route the optical signals to or from to the WSS 702, 704 in each input and output ports of each edge A1, A2, B1, B2, B3, C1, C2.

Figure 8:
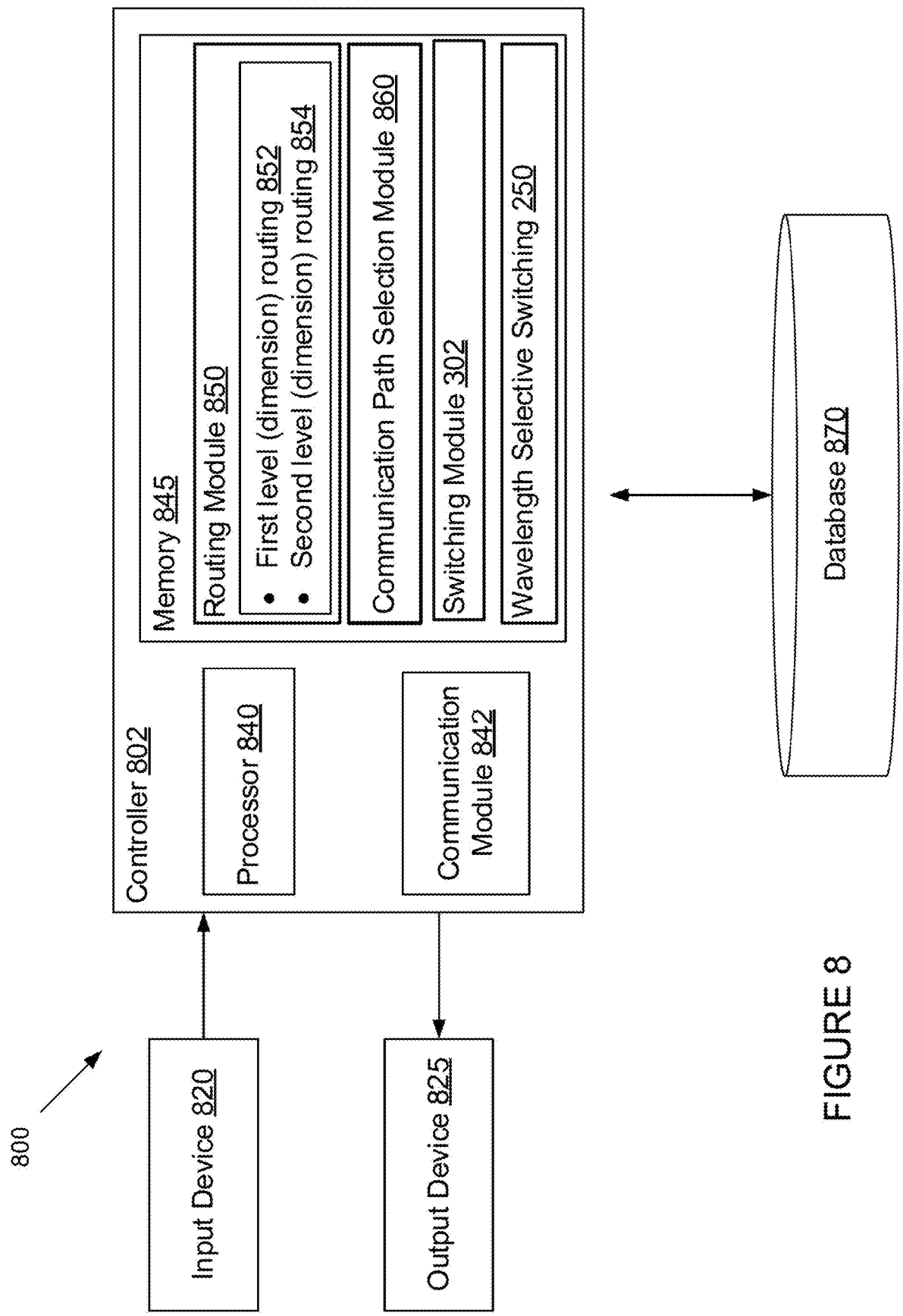
FIG. 8 shows an example block diagram of an example controller suitable for use as the CDC network controller of FIG. 1 in accordance with aspects of the disclosure.

FIG. 8 shows an example block diagram of an example controller suitable for use as the optical CDC network controller of FIG. 1 in accordance with aspects of the disclosure. It is noted that the controller 802 may be similarly configured as the controller 151 depicted in FIG. 1.

In one example, the controller 802 is suitable for use as the network controller 151 shown in FIG. 1. The controller 802 is configured determine routes and communication paths for data through a network and to allocate optical signals to such routes on each of the edges connecting nodes of the optical CDC network. The controller 802 includes a memory 845, a processor 840, and a communications module 842 to transfer data, receive commands, and provide instructions. The memory 845 stores computer executable instructions, which when executed, implement the functionality and/or control of a switching module 302, a wavelength selective switching module 250, a routing module 850 and a communication path selection module 860. In other implementations, the switching module 302 may be implemented in hardware in the controller 802. In still other implementations, the switching module 302 may be implemented as a combination of hardware and software. The communications module 842, for example, a network interface driver, can be configured to output over a network interface card the output of the switching module 302 to the various nodes of the network the controller 802 manages. The network interface card may be configured for electrical and/or optical communication.

The controller 802 may be coupled to one or more input devices 820, such as a mouse, a keyboard, a touch screen display, and the like, and one or more output devices 825, such as a display, a speaker, and the like. Accordingly, a user may enter commands and queries to controller 802 with the input device 820 and receive graphic and other information from controller 802 via output device 825. In some implementations, the input device 820 and output device 825 can be controlled using a graphic user interface (GUI), enabling a user to have access to the controller 802. In other implementations, the input device 820 and/or the output device 825 may be communicatively connected to the controller 802 through a network. In such implementations, the input device 820 and output device 825 may be the receiver and transmitter, respectively (or collectively the transceiver), of a network interface card. The input device 820 and output device 825 can be utilized by a user to set configuration parameters for the switching module 302, the WSS 250, the routing module 850 and the communication path selection module 860. In other implementations, configuration parameters may be entered by a user of a remote computing device that communicates with the controller 802 via a network connection, or they may be set autonomously or semi-autonomously by a traffic engineering system located within or external to the network being controlled.

A database 870 stores a variety of information for access and processing by the switching module 302, the routing module 850 and the communication path selection module 860. Such information includes, without limitation, routing information, such as source and/or destination nodes, network topology information, such as including first or second level connectivity information, traffic demand information, current spectrum allocations, and allocating additional circuits or optical channels to each edge in the network.

In one example, the routing module 850 may determine how the communication paths may be configured or arranged among different nodes. For example, the routing module 850 may determine the communication paths configured or arranged in the first level or dimension routing 852, which is the wavelength selecting switching provided in the existing communication path architecture via WSS 250 among different directions. Furthermore, the routing module 850 may determine the communication paths configured or arranged in the second level or dimension routing 854, which is the additional fiber level switching among network node degrees in the same direction. The communication path selection module 860 may determine and identify the suitable communication paths to transmit optical signals with desired performance, such as transmission speed, cost, etc. These modules may work collectively to carry out the method discussed below in relation to FIG. 10. The functionality of each module will be described further in relation to the various operations of the method shown in FIG. 10. As used herein, a "module" refers to a cohesive body of software code (or computer executable instructions) or electronic logic blocks configured to carry out a defined function. In other implementations, one or more of the above modules may be combined into a larger module or divided into multiple smaller, more discrete modules, which collectively perform the described functionality.

Figure 9:
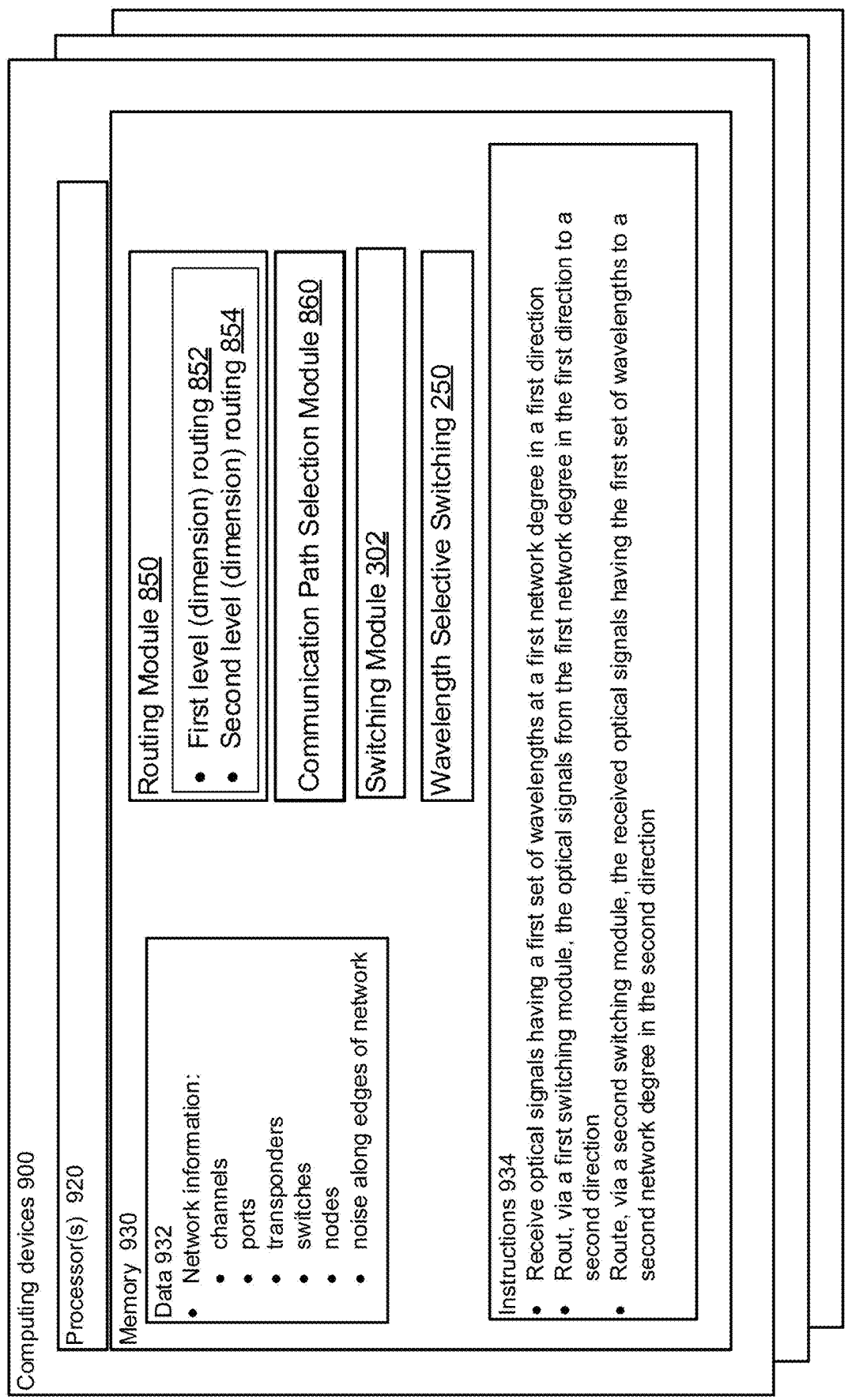
FIG. 9 shows an example block diagram of a node in the CDC network in accordance with aspects of the disclosure.

FIG. 9 shows an example block diagram of a node, such as Node 1, Node 2, Node 3 or Node 4, in the optical CDC mesh network 100 in accordance with aspects of the disclosure. It should not be considered as limiting the scope of the disclosure or usefulness of the features described herein. In this example, the node, such as Node 1, Node 2, Node 3 or Node 4, is shown with one or more computing devices 900. The computing device 900 contains one or more processors 920, memory 930 and other components typically present in general purpose computing devices. Memory 930 of the computing devices 900 can store information accessible by the one or more processors 920, including instructions 934 that can be executed by the one or more processors 920. For example, configuration and allocation of the communication paths in the first or second levels or dimensions defined by the switching modules as discussed above may be performed by the one or more processors 920 according to instructions 934 and data 932 in memory 930. In some examples, the computing devices 900 may also include the routing module 850, the communication path selection module 860, the switching module 302 and the WSS 250 programmed therein that can be retrieved, manipulated or stored by the processor 920. It is noted that the computing devices 900 including the routing module 850, the communication path selection module 860, the switching module 302 and the WSS 250 may be programmed in the controller 151, 802 implemented in the optical CDC mesh network 100, or in each of the node, such as the computing device 900 depicted in FIG. 9. The controller 151, 802 and the computing device 900 may be in electrical communication in any suitable manner to select, establish, or allocate communication paths.

In one example, the memory 930 can also include data 932 that can be retrieved, manipulated or stored by the processor 920. The memory can be of any non-transitory type capable of storing information accessible by the processor, such as a hard-drive, memory card, ROM, RAM, DVD, CD-ROM, write-capable, and read-only memories.

Data 932 may be retrieved, stored, or modified by the one or more processors 1020 in accordance with the instructions 934. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data. As shown, the data 932 may include data on various components of the node and of the optical CDC mesh network 100.

The instructions 934 can be any set of instructions to be executed directly, such as machine code, or indirectly, such as scripts, by one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. As shown, the instructions 934 may include functions or methods for controlling various components of the node, such as Node 1, Node 2, Node 3, or Node 4 to perform routing, conversion, etc.

The one or more processors 920 can be any conventional processor, such as a commercially available CPU. Alternatively, the processors can be dedicated components such as an application specific integrated circuit ("ASIC") or other hardware-based processor. Although not necessary, one or more of the computing devices 900 may include specialized hardware components to perform specific computing processes.

Although FIG. 9 functionally illustrates the processor, memory, and other elements of computing devices 900 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 900. Accordingly, references to a processor, computer, computing device, or memory will be understood to include references to a collection of processors, computers, computing devices, or memories that may or may not operate in parallel. For example, the computing devices 900 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 900 may be capable of directly and indirectly communicating with other nodes of the optical CDC mesh network 100. Computing devices in the optical CDC mesh network 100, such as computing devices 900, may be interconnected using various protocols and systems, such that computing devices in the optical CDC mesh network 100 can be part of the Internet, World Wide Web, specific intranets, wide area networks, or local networks. Computing devices in the network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Figure 10:
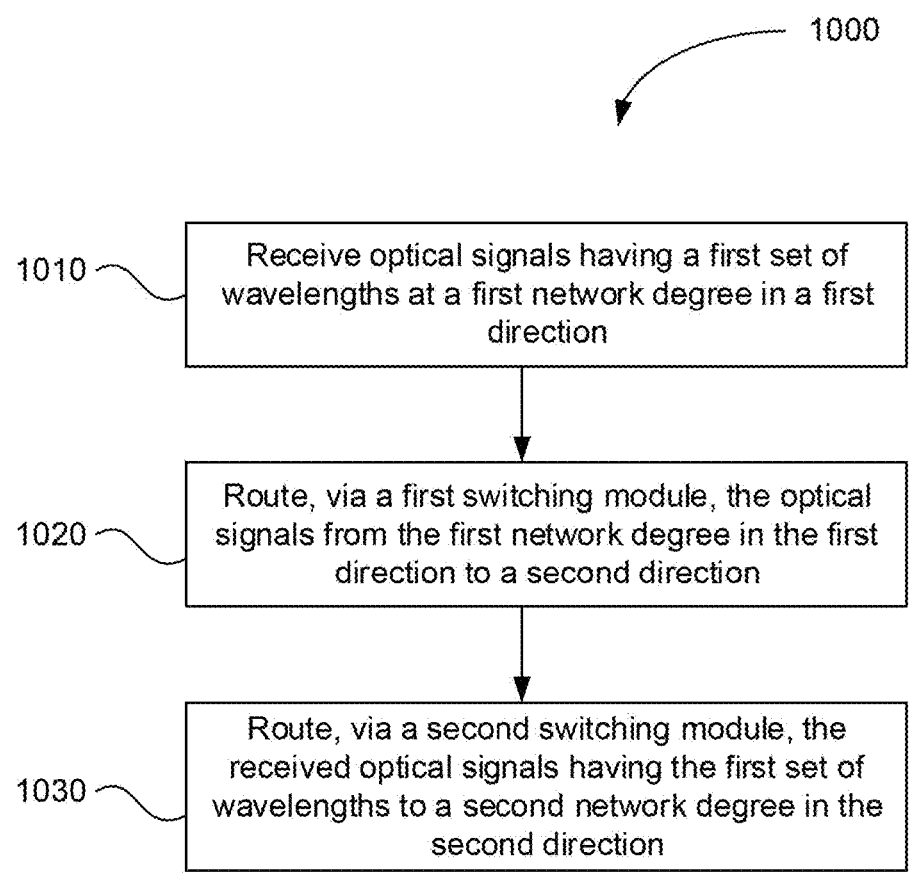
FIG. 10 is a flow diagram in accordance with aspects of the disclosure.

FIG. 10 shows an example flow diagram that may be performed by a node, such as Node 1, Node 2, Node 3 or Node 4 described above, of an optical CDC network, such as the optical CDC mesh network 100. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

For example, a node in the optical CDC network 100, such as Node 1, Node 2, Node 3, or Node 4, may receive optical signals, configured to route the optical signals to other nodes in the optical CDC network 100. In some instances, the flow diagram may at least partially be performed by computing devices in the optical CDC network 100, such as computing devices 900 shown in FIG. 9.

Referring to FIG. 10, in block 1010, optical signals having a first set of wavelengths are received at a first network degree in a node. For example, as shown in FIG. 2, incoming optical signals may be received at the input port $202_{B1}$ at degree B1 at first direction B.

In block 1020, the received optical signals may then be allocated by the WSS 250 to allow wavelength switching between directions A, B, C, as first level switching.

In block 1030, the optical signal may further be routed through the fiber level switching module 302 fiber switching between network degrees within a direction A, B, or C, as second level switching. The switching module 302 provides an additional dimension, such as a second level of network degree switching to allow fiber level switching between network degrees at the same direction. For example, as described above, the incoming optical signals from the input port $202_{B1}$ at degree B1 may be routed to a selected network degrees, such as degrees A1, or A2 within direction A, or as degrees C.1, or C2 within direction C. In some examples, the optical signals may be converted into electrical signals by add/drop modules. In this regard, one or more transponders from add/drop modules may convert the received optical signals into electrical signals. For example, as shown in FIGS. 3, 4, 6, 7, transponders 350 may be configured to convert incoming optical signals into electrical signals.

It is noted that multiple switches, including WSS and fiber level switching modules, may be configured to perform the routing of the optical signals to different degrees and/or different directions.

The technology is advantageous because it provides an additional level of switching in the nodes by utilizing a fiber level switching module or an array of fiber level switching modules in the node. As described above, different types of WSS and the add/drop modules may also be utilized to facilitate utilization of the optical signal transmission in the optical CDC network.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
a first type of switching module at a first network degree of a first direction in a node of a network, the first type of switching module configured to receive optical signals and transmit the optical signals having a first set of wavelengths;
a second type of switching module in communication with the first type of switch at the first network degree, the second type of switching module configured to receive the optical signals having the first set of wavelengths from the first type of switching module; and
a third type of switching module in communication with the second type of switching module and an add/drop module, the third type of switching module configured to route the optical signals having the first set of wavelengths to or from the add/drop module at a predetermined network degree, wherein:
the add/drop module is configured to add or drop one or more wavelengths of the first set of wavelengths, and
the add/drop module is separate from the third type of switching module.

2. The system of claim 1, wherein the first type of switching module comprises one or more wavelength selective switches (WSS).

3. The system of claim 1, wherein the second type of switching module comprises one or more optical circuit switches (OCS) or optical fiber switches.

4. The system of claim 1, wherein the add/drop module comprises:
one or more data center interconnect (DCI) transponders connected to the add/drop module; and
a plurality of add or drop ports configured to transport optical signals from the one or more DCI transponders.

5. The system of claim 1, wherein the third type of switching module is configured to transmit or receive the optical signals from the add/drop module to at least one of the first network degree, a second network degree, or another network degree.

6. The system of claim 1, wherein the third type of switch module comprises one or more optical circuit switches (OCS) or optical fiber switches.

7. The system of claim 1, further comprising:
a fiber shuffle configured to route the optical signals to or from the second type of switching module.

8. The system of claim 1, wherein each network degree comprises two of the first type of switching modules and two corresponding amplifiers.

9. The system of claim 1, wherein a fiber shuffle is configured to route the optical signals from the first network degree to a second network degree in a second direction.

10. The system of claim 9, wherein at least one of:
the first type of switching module is configurated to route, via the fiber shuffle, the received optical signals to a plurality of ports configured for receiving one or more wavelengths of the first set of wavelengths in the second direction, or
the second type of switching module is configured to route, via the fiber shuffle, the received optical signals among a plurality of degrees in the second direction.

11. A network, comprising:
a plurality of nodes connected to one another, wherein at least one node of the plurality of nodes comprises:
a first type of switching module at a first network degree of a first direction in a node of a network, the first type of switch configured to receive optical signals and transmit the optical signals having a first set of wavelengths;
a second type of switching module in communication with the first type of switch at the first network degree, the second type of switching module configured to receive the optical signals having the first set of wavelengths from the first type of switching module; and
a third type of switching module in communication with the second type of switch and an add/drop module, the third type of switching module configured to route the optical signals having the first set of wavelengths to or from the add/drop module at a predetermined network degree, wherein:
the add/drop module is configured to add or drop one or more wavelengths of the first set of wavelengths, and
the add/drop module is separate from the third type of switching module.

12. The network of claim 11, further comprising:
a first node in the network connecting to a second node via multiple edges in the first direction.

13. The network of claim 12, further comprising:
a third node in the network connecting to the second node via multiple edges in the second direction different from the first direction.

14. The network of claim 12, wherein the multiple edges comprise parallel multiple fiber rails.

15. The network of claim 11, wherein the first type of switching module comprises one or more wavelength selective switches (WSS) configured to route the received optical signals to a plurality of ports configured for receiving one or more wavelengths of the first set of wavelengths in the second direction.

16. The network of claim 11, wherein the second type of switching module comprises one or more optical circuit switches (OCS) or optical fiber switches configured to route the received optical signals among the plurality of the network degrees in the second direction.

17. A method, comprising:
receiving, at a first network degree of a first direction of a node of a network, optical signals having a first set of wavelengths;
receiving, at a second switching module, the received optical signals having the first set of wavelengths; and
receiving, at a third switching module, the received optical signals having the first set of wavelengths, wherein:

the third switching module is configured to route the optical signals having the first set of wavelengths to or from an add/drop module at a predetermined network degree,
the add/drop module is configured to add or drop one or more wavelengths of the first set of wavelengths, and
the add/drop module is separate from the third switching module.

18. The method of claim 17, further comprising:
routing the optical signals from the third switching module to the add/drop module in the network.

19. The method of claim 17, wherein the first switching module comprises one or more wavelength selective switches (WSS).

20. The method of claim 17, wherein the second switching module comprises one or more optical circuit switches (OCS) or optical fiber switches.

* * * * *